Figure 1:
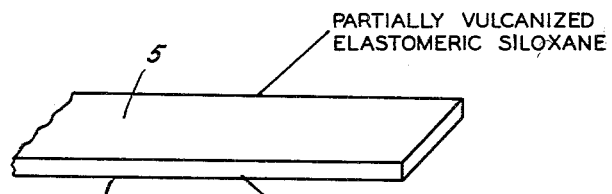

May 17, 1955    W. R. COLLINGS    2,708,289
METHOD OF PREPARING PRESSURE SENSITIVE
ORGANOSILOXANE SHEET MATERIAL
Filed Oct. 3, 1951

INVENTOR.
William R. Collings

2,708,289

METHOD OF PREPARING PRESSURE SENSITIVE ORGANOSILOXANE SHEET MATERIAL

William R. Collings, Midland, Mich., assignor to Dow Corning Corporation, Midland, Mich., a corporation of Michigan Application October 3, 1951, Serial No. 249,445

7 Claims. (Cl. 18—57)

This invention relates to a method of preparing a pressure sensitive organosiloxane sheet material.

Pressure sensitive adhesive tapes have found a wide application in many industrial and domestic uses. They are particularly adaptable for use in the insulation of electrical equipment. At present electrician's tape is fabricated from organic materials. These materials have a definite limitation due to their inherent thermal instability. It is greatly to be desired to produce a pressure sensitive sheet material which may be utilized at temperatures in excess of 200° C. and which possesses the requisite electrical properties so that it may be employed in the insulation of conductors.

It is an object of this invention to produce a pressure sensitive sheet material which may be employed at temperatures above 200° C. Another object is to provide a method of preparing an elastomeric siloxane in such form that it may be conveniently applied to electrical conductors. Other objects and advantages will be apparent from the following description.

This invention relates to a method of preparing a pressure sensitive organosiloxane elastomeric sheet material which is tacky on one side and tack-free on the other. Such a sheet material comprises an organopolysiloxane, a filler, and from 2 to 5 per cent based on the weight of the siloxane of a vulcanizing agent selected from the group benzoyl peroxide and tertiary butyl perbenzoate. The organosiloxane has a degree of substitution of from 1.98 to 2 organic radicals per silicon atom, said radicals being methyl or phenyl.

In accordance with this invention the pressure sensitive sheet material is prepared by heating a mixture of the siloxane, filler and vulcanizing agent on a flat surface in an atmosphere of steam at a temperature of from 80° C. to 95° C. for from 15 to 35 minutes. This process produces a material which is vulcanized to a tack-free condition on the side next to the surface and is partially vulcanized and tacky on the side away from the surface.

The organosiloxanes employed in this invention are polymers composed mainly of the reoccurring structural unit $R_2SiO$ where R is a phenyl or methyl radical. The units are linked together through the oxygen atoms thereof. Such organosiloxanes are known to the art and may be prepared by any of several well-known methods.

It is to be understood that the organic radicals attached to each silicon may be the same or different radicals. Also the siloxane may be a copolymer in which there are two or more types of diorganosiloxane units. Thus, for example, the siloxane copolymer may contain a combination of any of the following units: $(CH_3)_2SiO$, $(C_6H_5)_2SiO$ and $(C_6H_5)CH_3SiO$. It is preferred that the siloxane contain at least 50 mol per cent dimethylsiloxane units.

In addition to the above diorganosiloxane units the copolymer may contain small amounts of monoorganosiloxane units and triorganosiloxane units. In any event the proportion of the variously substituted siloxane units is such that there is on the average from 1.98 to 2 organic radicals per silicon atom.

The polysiloxane may be either soluble in benzene or insoluble therein. The soluble polymers range from liquids of above 8000 cs. viscosity to soft solid non-flowing materials which have penetrometer readings below 380 (expressed in tenths of a mm.) in 10 seconds at 25° C. Penetrometer readings are determined according to ASTM, D-217-44T. The insoluble polymers are gels which are cross linked. When the siloxane is a liquid at room temperature the amount of filler employed is in amount sufficient to form a pasty mass.

Suitable fillers include silica such as silica aerogels and fume silicas, $TiO_2$, $ZnO$, $MgO$, $CaCO_3$, clay, bentonite, asbestos and glass flocks. In general, any inorganic material melting above 300° C. can be employed. The preferred amount of filler is from 20 to 200 parts by weight of filler per 100 parts of siloxane.

The vulcanizing agents employed are benzoyl peroxide and tertiary butyl perbenzoate. These materials are preferably used in amount from 2 to 5 per cent by weight based upon the weight of the siloxane, and either one alone, or a mixture of both, may be used. When less than 2 per cent is employed the sheet material is not sufficiently vulcanized in a practical length of time. If greater than 5 per cent vulcanizing agent is employed, the material is likely to foam during vulcanization.

The siloxane, filler and vulcanizing agent may be compounded in any appropriate manner. One method is to give the materials a preliminary mix in a dough mixer and then mill.

The compounded organosiloxane is partially vulcanized by heating it on a flat surface at a temperature of from 80° C. to 95° C. in an atmosphere of steam for a period of from 15 to 35 minutes. At higher temperatures the material foams during vulcanization, and consistently satisfactory results have not been obtained other than by the method of the present invention.

The particular process employed to carry out the method of this invention may be varied. One convenient method is to extrude the compounded siloxane onto a flat surface and roll it into a sheet of the desired thickness, preferably a thickness of between 10 and 60 mils. The material is then heated in a suitable treating chamber which is filled, or partially filled, with exhaust steam in a quantity sufficient to provide the desired temperature. The partially cured sheet may then be cut into strips in any desired width and used as a tape. Under the prescribed conditions the face of the sheet next to the flat surface is vulcanized to a tack-free condition whereas the face of the sheet away from the surface remains tacky.

A variety of materials may be used to form the "flat surface" in the practice of this invention. Of course a material should be chosen which will not deteriorate under the vulcanization conditions employed. Likewise, the material should give a clean release from the finished product. Examples of materials which may be used are aluminum, polyethylene, cellulose acetate, "Teflon" (polytetrafluoroethylene), and unplasticized ethylcellulose. The preferred materials are aluminum, which may be used in the form of sheets or foil, and polyethylene, which is preferably used as a coating on paper.

It is preferred to conduct the process of the present invention on a continuous basis. This may be done, for example, by continuously extruding a sheet of the compounded organosiloxane upon a moving tape of polyethylene coated kraft paper. The paper tape with its superimposed layer of compounded organosiloxane is then fed through squeeze rolls. The upper roll, which would come into direct contact with the organosiloxane, is preferably prevented from such direct contact by an intervening sheet of material such as cellulose acetate foil, thus preventing the organosiloxane from sticking to the roll. The tape is then conducted through the vulcanizing chamber. This chamber is preferably in the form of a tower. The tape may enter the tower at the top, then be conducted down one side and up the other side. It comes out from the top of the tower bearing the finished product, and is wound upon a windup roll. Thus the polyethylene coated paper not only serves as a support and a "flat surface" throughout the process, but also serves as an interleaving sheet in rolling up the pressure sensitive organosiloxane elastomeric product.

In a preferred form, the tower consists of two vertical arms connecting a base portion and a top portion. The tape travels down one arm and up the other arm. Live steam is released through a control valve and blown against a baffle plate in the base of the tower, and thus enters the tower at the base in the form of exhaust steam. The top portion of the tower is provided with an outlet arm which leads through a blower back to the base of the tower, thus the exhaust steam can be circulated through the system. Circulation of the exhaust steam in this manner inherently draws a certain amount of air into the system through the open top of the tower. An air intake fan may also be used in the system, however, to aid in regulating the temperature within the tower. Best results are obtained by operating the tower in such a manner that when the tape first enters the tower it passes through a region held at about 85° C. for a time interval of approximately 20 to 25 per cent of the entire curing time, with the remainder of the tower being held at about 90° C.

If desired, a glass or other heat resistant fabric may be laminated with the siloxane elastomer. The presence of such a fabric reduces the stretch of the partially vulcanized siloxane and thus makes the sheet material more suitable for certain uses. Two forms of laminates are employed, namely those in which the fabric is between layers of siloxane and those in which the fabric forms an outside layer of the laminate. In the latter case the fabric is adhered to a tack-free side of the elastomer sheet.

The accompanying drawing shows three possible forms of the sheet materials of this invention. Figure 1 shows an elevation of a unitary sheet containing no fabric. In such a sheet the siloxane gradually changes from a completely vulcanized non-tacky state on the bottom surface 4 to a partially vulcanized tacky state on the top surface 5. The dividing line between the tacky and the non-tacky layers is indistinct as there is a gradual change from one state to another.

Figure 2:
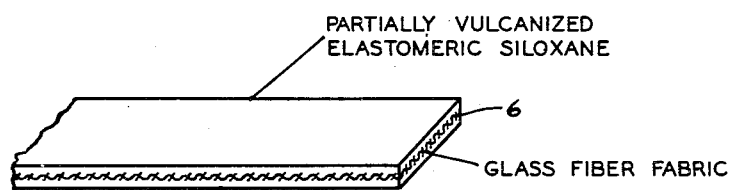

Figure 2 shows an elevation of a laminated sheet which contains a glass fabric 6 between two layers of the siloxane. Such a material is fabricated by applying a coating of the compounded siloxane to both sides of the fabric. The laminated sheet is then vulcanized as above whereupon the bottom of the laminate is cured but the top side remains tacky.

Figure 3:
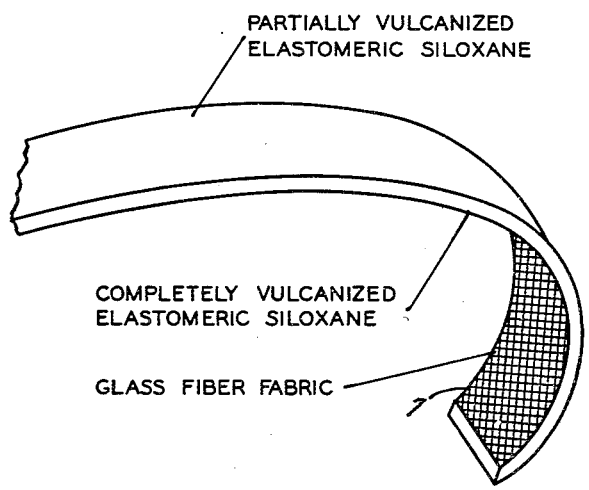

Figure 3 shows an elevation of the sheet which has been bent and twisted to show both sides. This sheet has a layer of glass fabric 7 on the bottom above which is a layer of elastomeric siloxane. The face of the siloxane layer next to the glass fabric is completely vulcanized, while the side away from the fabric is tacky.

Such a laminate may be fabricated by dipping a glass fabric in a dilute solution of a compounded siloxane in a volatile solvent, removing the fabric therefrom, and allowing the solvent to evaporate. This produces a thin film of the siloxane on the fabric. The coated fabric is then placed on a flat surface and a layer of compounded siloxane of the desired thickness is placed thereon. The laminate is then vulcanized in the manner shown above, whereupon the siloxane next to the fabric is vulcanized completely and thereupon binds the fabric to the siloxane layer.

One of the outstanding uses for the product of this invention is in insulation of electrical equipment. It is possible to apply an elastomeric coating to electrical conductors by wrapping them with the sheet material of this invention. This method is often more economical and produces more satisfactory results than the extrusion method. Furthermore, there are many circumstances under which the only feasible manner of conveniently applying a coating to a conductor is by wrapping it with a tape.

The most outstanding feature of the material of this invention is that once it is applied in layers to a base member it may then be further vulcanized by heating at a temperature above 100° C. whereupon the various layers will fuse to form a unitary void-free coat. This is possible because the partially cured tacky surface of the pressure sensitive sheet material still contains active vulcanizing agent and is further cured upon heating.

The present materials are equally adaptable for use in the fabrication of hoses. The pressure sensitive sheet material may be wrapped on a cylindrical form and then further cured by heating to form a hose with void-free walls.

The following examples are illustrative only. All parts given are parts by weight.

*Example 1*

Mixed cyclics of dimethylsiloxane were polymerized by heating them with aqueous potassium hydroxide in amount of one potassium atom per 500 silicon atoms at a temperature of 170° C. until a soft gel was obtained. The polymer was compounded by milling 100 parts of the dimethylsiloxane gel, 65 parts "Celite 505" (diatomaceous earth), 5 parts "Mapico Tan" ($Fe_2O_3$), one part t-butylperbenzoate and 5.7 parts "Luperco ASF" (a suspension of 50 per cent benzoyl peroxide in a dimethylpolysiloxane fluid). The compounded material thus obtained was in the form of a paste.

The paste was extruded as a 30 mil film upon a tape of polyethylene coated kraft paper. The tape and its superimposed layer of compounded paste was passed through squeeze rolls and fed through a vulcanizing tower at a rate such that the paste was within the tower for a total of about 25 minutes. The area within the vulcanizing tower, which was open to the atmosphere, was held at a temperature between 85° C. and 90° C. by a mixture of exhaust steam and air. The first few minutes of exposure of the paste to the elevated temperature of the tower was in a portion of the tower which was held at 85° C. The remainder of the curing time was at the higher temperature of 90° C. The elastomeric organosiloxane tape thus produced was found to be cured to a non-tacky condition on the surface next to the polyethylene coated paper, but was only partially cured to a semi-tacky condition on the opposite surface.

*Example 2*

A glass fabric was dipped in a 10 per cent carbontetrachloride suspension of the compounded organosiloxane of Example 1 and then run between rolls, where more of the compounded organosiloxane was applied, thus producing a laminate with a thickness of about 10 mils. When this coated fabric is vulcanized in a manner similar to Example 1, a laminated tape is obtained which is vulcanized to a non-tacky state on one surface while the other surface remains tacky.

*Example 3*

A copolymeric siloxane having the composition 97 mol per cent dimethylsiloxane and 3 mol per cent phenylmethylsiloxane was prepared as follows:

A mixture of 1000 parts of octamethylcyclotetrasiloxane and 59.1 parts of phenylmethylsiloxane was heated to 160° C. A potassium hydroxide-isopropanol complex was added in amount of one potassium atom per 5000 silicon atoms. Heating at 160° C. was continued for about 25 minutes, whereupon a viscous copolymer was obtained which was poured into an open container and allowed to cool. The copolymer had a penetrometer reading of 260 in 30 seconds at 25° C. and was completely soluble in benzene.

100 parts of this copolymer was compounded with 140 parts of TiO$_2$ and 3 parts benzoyl peroxide. When the paste thus obtained is vulcanized in a manner similar to that of Example 1, a pressure sensitive tape which is tack-free on one side and tacky on the other is obtained.

*Example 4*

A copolymer having the composition 93 mol per cent dimethylsiloxane and 7 mol per cent diphenylsiloxane was prepared as follows:

1000 parts of octamethylcyclotetrasiloxane and 198 parts of octaphenylcyclotetrasiloxane were dissolved in 108 parts of xylene and heated to 160° C. A potassium hydroxide-isopropanol complex was added in amount of one potassium atom per 5000 silicon atoms. Heating was continued at 160° C. for 4½ hours as xylene was removed. The resulting copolymer was poured into an open container and cooled, giving a material having a penetrometer reading of 250 in 30 seconds at 25° C. and which was completely soluble in benzene.

100 parts of this copolymer was compounded with 140 parts of TiO$_2$ and 2 parts of benzoyl peroxide. When the resulting paste is vulcanized by the method of Example 1, pressure sensitive sheet material is obtained which is tacky on one side and non-tacky on the other. This material is used to insulate electrical conductors and in the fabrication of hoses.

That which is claimed is:

1. The method of preparing an organosiloxane elastomeric pressure sensitive sheet material comprising partially vulcanizing a compounded organosiloxane by heating it at a temperature of from 80° C. to 95° C. for from 15 to 35 minutes on a flat surface in an atmosphere of steam and air whereby a partially cured siloxane sheet which is tack-free on one side and tacky on the other is obtained, said compounded siloxane consisting of a mixture of (1) an organopolysiloxane having a degree of substitution of from 1.98 to 2 organic radicals per silicon atom, said organic radicals being selected from the group consisting of phenyl and methyl radicals, at least 50 mol per cent of the siloxane units being dimethylsiloxane units, (2) a filler, and (3) from 2 to 5 per cent by weight based upon the weight of the siloxane of an aromatic acyl peroxide selected from the group consisting of benzoyl peroxide and tertiary butyl perbenzoate.

2. The method of claim 1 wherein the flat surface is a polyethylene coated paper.

3. The method of claim 2 wherein the organosiloxane is a dimethylpolysiloxane.

4. The method of claim 3 wherein the amount of filler is from 20 to 200 parts by weight per 100 parts by weight of the dimethylpolysiloxane.

5. The method of claim 4 wherein the filler is a silica filler.

6. The method of preparing an organosiloxane elastomeric pressure sensitive sheet material comprising partially vulcanizing a laminate of a compounded organosiloxane and a glass fibric by heating it at a temperature of from 80° C. to 95° C. for from 15 to 35 minutes on a flat surface in an atmosphere of steam and air whereby a flexible laminate which is tack-free on one side and tacky on the other is obtained, said compounded siloxane comprising a mixture of (1) an organopolysiloxane having a degree of substitution of from 1.98 to 2 organic radicals per silicon atom, said organic radicals being selected from the group consisting of phenyl and methyl radicals, at least 50 mol per cent of the siloxane units being dimethylsiloxane units, (2) a filler, and (3) from 2 to 5 per cent by weight based upon the weight of the siloxane of an aromatic acyl peroxide selected from the group consisting of benzoyl peroxide and tertiary butyl perbenzoate.

7. The method of preparing an elastomeric organosiloxane tape comprising partially vulcanizing a compounded organosiloxane by heating it at a temperature of from 80° C. to 95° C. for from 15 to 35 minutes on a flat surface in an atmosphere of steam and air whereby an organosiloxane tape which is tack-free on one side and tacky on the other is obtained, said compounded siloxane comprising a mixture of (1) an organopolysiloxane having a degree of substitution of from 1.98 to 2 organic radicals per silicon atom, said organic radicals being selected from the group consisting of phenyl and methyl radicals, at least 50 mol per cent of the siloxane units being dimethylsiloxane units, (2) a filler in an amount of from 20 to 200 parts by weight per 100 parts by weight of the organopolysiloxane, and (3) from 2 to 5 per cent by weight based upon the weight of the siloxane of an aromatic acyl peroxide selected from the group consisting of benzoyl peroxide and tertiary butyl perbenzoate.

References Cited in the file of this patent

UNITED STATES PATENTS

| | | |
|---|---|---|
| 2,460,795 | Warrick | Feb. 1, 1949 |
| 2,488,446 | Swiss | Nov. 15, 1949 |
| 2,491,097 | Feagin | Dec. 13, 1949 |
| 2,500,728 | Williams | Mar. 14, 1950 |